No. 618,905. Patented Feb. 7, 1899.
A. B. QUIMBY.
GUARD FOR HOSE COUPLINGS.
(Application filed Feb. 14, 1898.)

(No Model.) 2 Sheets—Sheet 1.

Witnesses
W. C. Collies
Martin H. Olsen.

Inventor
Asahel B. Quimby
By Coburn, Hibben & McElroy
Attys

No. 618,905. Patented Feb. 7, 1899.
A. B. QUIMBY.
GUARD FOR HOSE COUPLINGS.
(Application filed Feb. 14, 1898.)
(No Model.) 2 Sheets—Sheet 2.
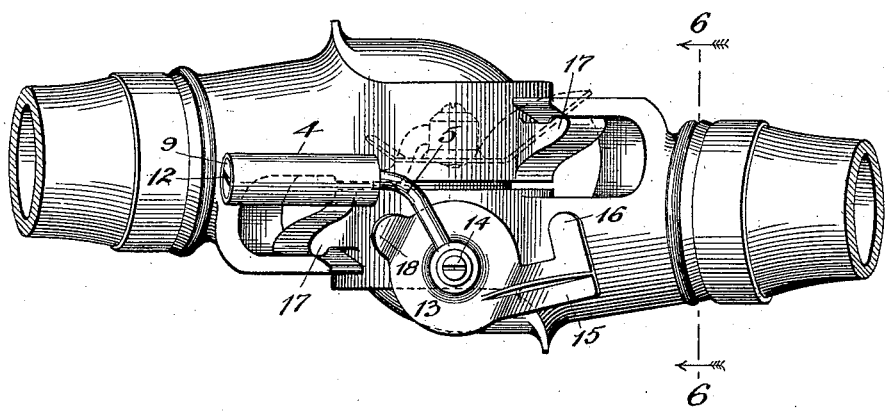
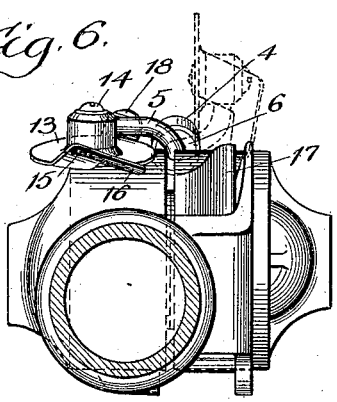
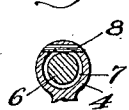
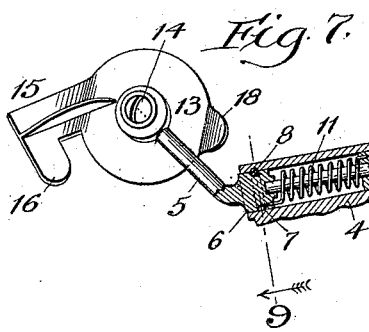
Witnesses
W. C. Coties
Martin H. Olsen
Inventor
Asahel B. Quimby
By Coburn, Hibben & McElroy
Atty's
THE NORRIS PETERS CO., PHOTO-LITHO., WASHINGTON, D. C.

UNITED STATES PATENT OFFICE.

ASAHEL B. QUIMBY, OF TRACY, MINNESOTA, ASSIGNOR OF ONE-FOURTH TO FRANK N. STEWART, OF SAME PLACE.

GUARD FOR HOSE-COUPLINGS.

SPECIFICATION forming part of Letters Patent No. 618,905, dated February 7, 1899.

Application filed February 14, 1898. Serial No. 670,216. (No model.)

*To all whom it may concern:*

Be it known that I, ASAHEL B. QUIMBY, residing at Tracy, in the county of Lyon and State of Minnesota, have invented a certain new and useful Guard for Hose-Couplings, of which the following is a specification.

The object of my invention is to provide simple and effective means for closing the passage in hose-couplings, such as air-brake and signal-pipe hose-couplings, whereby dust, sand, water, snow, and any other foreign matters may be excluded. When these couplings are left open, as is the case with the couplings now in general use, such foreign matter collects therein, and if it does not entirely interrupt the passage of the air it is forced into the delicate mechanism of the signal or brake systems by the fluid-pressure under which they operate, thereby injuring them or affecting their efficiency. My device, which overcomes these objectionable features of the open coupling, comprises a closure or cap normally fitting upon the opening or passage in the coupling when uncoupled and adapted to be turned out of the way in the coupling operation and capable of automatically seating to close the passage when the hose is uncoupled without interfering with the functions of the system in connection with which it is employed.

Figure 1:
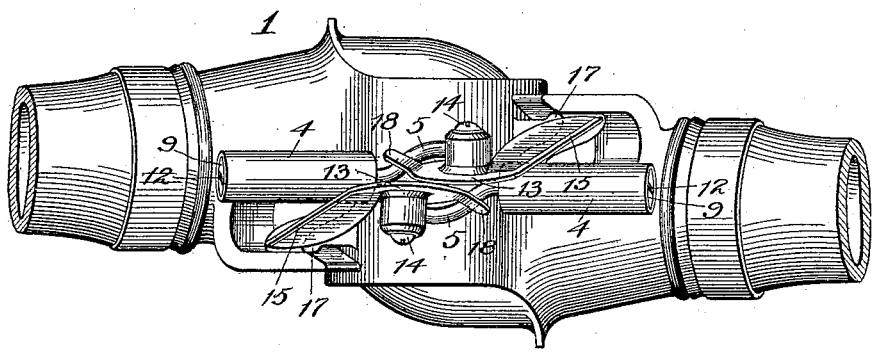
Figure 2:
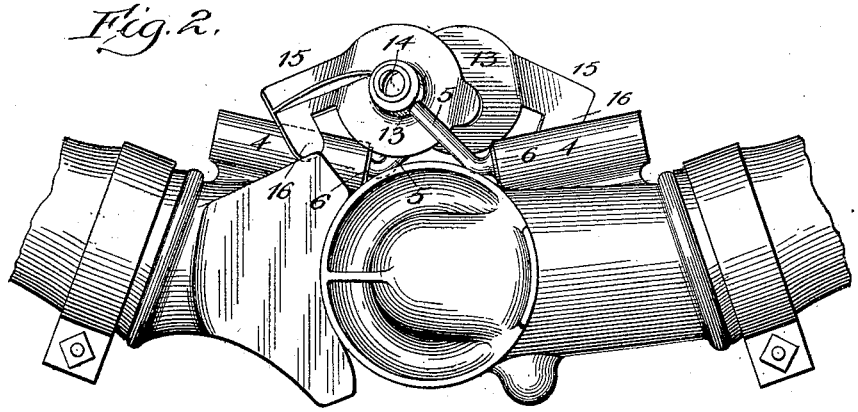
Figure 3:
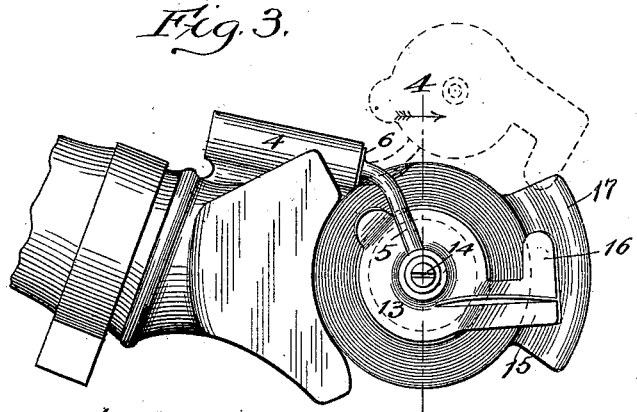
Figure 4:
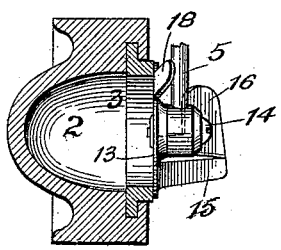

In the drawings, Figure 1 is a plan of two coupling-heads coupled together and both equipped with my device; Fig. 2, a side elevation thereof; Fig. 3, a view of one of the coupling-heads, showing in the full lines the guard or cap in position to close the coupling and in dotted lines showing its open position preliminary to the coupling operation; Fig. 4, a sectional elevation on line 4 of Fig. 3; Fig. 5, a view similar to Fig. 1, excepting that one only of the coupling-heads is equipped with my device; Fig. 6, a sectional elevation of a coupling on line 6 of Fig. 5, looking in the direction of the line of hose; Fig. 7, a detail view of the cap or guard and its hinging mechanism; Fig. 8, an end view of the cylinder shown in Fig. 7; and Fig. 9 a section of the cylinder on line 9 of Fig. 7, showing the pin used in holding the rod in the cylinder.

A coupling head or case 1, with its passage or opening 2 and gasket 3, may be the one in ordinary and well-known use, and as its particular construction does not enter into my invention it need not, therefore, be described further. Upon the head is arranged or formed a barrel or cylinder 4, with its length preferably substantially longitudinal of the line of the hose. This cylinder may be made separate from the head and attached thereto in any suitable manner, or it may be cast or otherwise formed integral with such head. It is so positioned and located upon the coupling-head that it will provide a proper means for hinging the cap or guard device hereinafter described in order that the same may have a rotatable movement transverse of the line of the hose.

As shown more particularly in Fig. 7, a rod or member 5 is adapted to be journaled or hinged in the cylinder, and for this purpose it is provided with a boss 6, formed thereon part way of its length and fitting the bore of the cylinder, thereby closing it at one end. As shown in the drawings, the rod is bent to the proper shape in order to give the desired rotation and direction of movement to the guard or cap which it carries at its free end, as hereinafter described. The boss has a circumferential groove 7, which receives a pin 8, whose ends pass through the sides of the cylinder, whereby the rod 5 is retained in place, but not prevented from rotating. The end of the rod within the cylinder preferably bears in a plug 9, which is normally held rigidly in place by a pin 10 and closes the outer end of the cylinder. A suitable spiral spring 11 encircles the end of the rod within the cylinder, and its free ends enter holes provided, respectively, in the boss and plug. The outer face of the plug is provided with a screw-slot 12, whereby the plug may be rotated after the pin 10 is removed for the purpose of regulating the tension of the spring.

The free end of the rod 5 is provided with a suitable flat cap or guard 13, which is mounted thereon by means of a screw or rivet 14 and is capable of a partial rotation thereon. The parts described are so positioned and proportioned that this spring-pressed cap will be capable of rotating with respect to the coupling-head and will normally fit upon the opening 2 to close the coupling when uncoupled. This cap or guard has an extension 15, which may be termed a "latch" and whose tongue 16 is adapted to engage under the forward lug 17 of the coupling-head, thus forming a catch device for holding the cap in open position when necessary in the coupling operation. The engagement of the cap under the end of this lug is clearly shown in dotted lines in Fig. 3. The cap is further provided with a curved wing or projection 18, which is adapted to be contacted by the forward lug of the other or engaging head in the operation of uncoupling, so as to throw it out of the way of this head at this time.

In Figs. 1 and 2 of the drawings I have shown my device applied to the heads of two engaging couplings, and in Fig. 5 I have shown it applied to one only of such heads. The device will operate equally well whether one or both engaging heads are equipped.

My guard being constructed as above set forth operates as follows: In normal position the guard or cap closes the coupling, as shown in full lines in Fig. 3; but when it is desired to couple up the brakeman first turns or rotates the cap sidewise into the position shown in dotted lines in Fig. 3, whereupon the latch will engage under the lug 17. In thus turning the guard or cap into open position the latch exercises a double function—namely, that of a catch device to retain the cap open and of a handle whereby the cap may be grasped. In case both couplings are similarly equipped with the guard of course both guards are first opened. The coupling is then made in the usual and well-known manner, in which operation, however, the inner lug of each coupling-head will contact the latch and release the same from its engagement, whereupon the caps or guards will snap together, as shown in Fig. 1. Both caps are now released and are ready to take their normal position to close the coupling whenever uncoupling occurs. In the act of uncoupling the outer lug of each head contacts the projection 18 on the guard belonging to its opposing head, thereby forcing each cap toward its original open position. When the heads are entirely disengaged, each cap is free to rotate and snap into position upon the air-passage to close the same, owing to the tension of its spring.

When but one of the engaging couplings is equipped with my device, the guard or cap is first opened before coupling to the position shown in dotted lines in Fig. 5, and when coupled the cap of the equipped coupling is released and contacts the body of the other coupling, as shown in full lines in Fig. 5, ready to snap in place to close the air-passage at the time of uncoupling.

The hinging mechanism for the cap or guard is very simple, and can be assembled and taken apart very readily by removing the pins. When it is desired to adjust the tension of the spring to secure proper working of the cap or guard, the pin 10 is removed and the plug 9 turned by an ordinary screw-driver in one direction or the other, depending upon whether the tension of the spring is to be increased or decreased. The boss and plug preferably fit the ends of the cylinder quite accurately, so that the cylinder is rendered practically dust and water proof.

As before stated, the cap or guard has a partial rotation on its rod, the purpose of which movement is to provide for swinging the latch slightly under the lug and also to permit the cap to be loosened easily from its seat in case it should become tight or frozen thereon. This movement will loosen the cap without damaging or tearing the gasket.

It is evident that the closing of the coupling is altogether automatic and must necessarily take place at the uncoupling operation and that it is not dependent upon the will of the trainman. The only additional duty devolving upon the trainman is to open the guard or cap; but this is always insured, because it must necessarily be done before the coupling can be accomplished. Consequently a perfectly reliable and efficient guard is provided, and the numerous objections and disadvantages of open couplings are entirely avoided. Furthemore, my device accomplishes its designed purpose without interfering with the functions or operations of the air-brake or signal system in connection with which it may be employed.

My device may be made separate and applied as an attachment to the many thousands of couplings now in actual use in a very simple manner, the only requirement being to properly attach to the coupling-head the proper bearing for the rod; but when the device is to be employed on new couplings it is preferable to cast the cylinder or bearing integral therewith, as shown in the drawings.

While I have herein shown and described more or less precise forms and details of construction, I do not intend to be understood as limiting myself thereto, as I contemplate changes in the form, the proportion of parts, and the substitution of equivalents as circumstances may suggest or render expedient and without departing from the spirit of my invention. Furthermore, my invention is not limited in its application to hose-couplings of the air-brake system or the signal-pipe system, as it is capable of other obvious applications. Therefore I contemplate its use whenever found applicable.

I claim—

1. In a hose-coupling, a guard or cap adapted to close the coupling and hinged upon the coupling with its axis substantially parallel to the longitudinal axis of the hose and coupling.

2. In a hose-coupling, a spring-pressed guard or cap adapted to close the coupling when uncoupled, said guard or cap being mounted upon the coupling with its axis substantially parallel to the longitudinal axis of the hose and coupling.

3. In a hose-coupling, a guard or cap hinged upon the coupling and having a movement in a plane substantially transverse of the coupling.

4. In a hose-coupling, the combination of a guard or cap mounted upon the coupling and normally closing the same when uncoupled such guard being movable in a plane substantially transverse to the line of the coupling and a catch mechanism capable of holding the cap in open position.

5. In a hose-coupling, the combination of a guard or cap mounted upon the coupling, a spring for normally holding the cap to close the coupling when uncoupled and catch mechanism capable of holding the cap in open position, the cap being adapted to be released automatically from the catch mechanism to close the coupling when the hose is uncoupled.

6. In a hose-coupling, the combination, with a coupling-head, of a member journaled on the head, a cap upon one end of said member and rotatable transverse of the head and means for normally holding the cap upon the coupling to close its opening or passage.

7. In a hose-coupling, the combination, with a coupling-head, of a member journaled on the head, a cap on the said member and rotatable transverse of the head and a spring for holding the cap in normal position upon the coupling to close its opening or passage.

8. In a hose-coupling, the combination, with a coupling-head, of a member pivoted on the head and a cap located upon said member and having a movement in a plane substantially transverse of the line of the coupling, said cap also having a partial movement upon said member.

9. In a hose-coupling, the combination, with a coupling-head, of a spring-pressed rod journaled on the head, a guard or cap carried thereby and normally in position to close the coupling, such guard being movable in a plane substantially transverse to the line of the coupling and catch mechanism working in connection with the rod and cap to hold the coupling open when desired.

10. In a hose-coupling, the combination with a coupling-head, having the usual outer end lug, of a spring-pressed rod journaled on the head, a guard or cap carried thereby and normally in position to close the coupling when uncoupled, and a projection arranged upon the cap and adapted to engage under the lug on the coupling-head and retain the cap in open position against the tension of the spring.

11. In a hose-coupling, the combination with a coupling-head, having the usual outer end lug, of a spring-pressed rod journaled on the head, a guard or cap carried thereby and normally in position to close the coupling when uncoupled, a catch device located upon the cap and adapted to engage under the lug to hold the cap in open position and an extension on the cap adapted to be contacted by the outer end lug of an engaging coupling to throw the cap open until complete uncoupling occurs.

12. In a hose-coupling, the combination with a coupling-head, of a cylinder thereon, a spring-pressed rod having one end journaled in the cylinder and a cap or closure carried by the rod and adapted to close the coupling when uncoupled.

13. In a hose-coupling, the combination with a coupling-head, of a cylinder thereon, a cap or guard adapted to close the coupling when uncoupled, an angle-rod journaled at one end in the cylinder and carrying the guard at its other end, and a spring normally holding the guard in closed position.

14. In a hose-coupling, the combination with a coupling-head, of an angle-rod mounted at one end upon the head and whose other or free end is adapted to rotate in a plane substantially transverse to the line of the coupling and a cap or guard carried on the free end of the rod and adapted to close the coupling when uncoupled.

15. In a hose-coupling, the combination with a coupling-head, of a cylinder thereon, a cap or guard adapted to close the coupling when uncoupled, a rod carrying the cap at one end and provided with a boss fitting in the cylinder and means for retaining the boss therewithin but permitting of its rotatable movement.

16. In a hose-coupling, the combination with a coupling-head, of a spring-pressed guard or cap adapted to normally close the coupling when uncoupled, and having a movement transverse of the longitudinal line of the hose and coupling and means for regulating the tension of the spring.

17. In a hose-coupling, the combination with a coupling-head, of a spring-pressed guard or cap normally closing the coupling when uncoupled and having a rotatable movement transverse of the longitudinal line of the hose and coupling, catch mechanism holding the cap in open position, and means for adjusting the tension of the spring.

18. In a hose-coupling, the combination with a coupling-head, of a cylinder thereon, a cap or guard adapted to close the coupling when uncoupled, a rod carrying the cap at one end and provided with a boss part way of its length, such boss fitting in the cylinder at one end, a plug in the other end of the cylinder providing a bearing for the end of the rod and a spring within the cylinder and acting to normally press the cap to its seat on the coupling to close the same.

19. In a hose-coupling, the combination with a coupling-head, of a cylinder thereon, a cap or guard adapted to close the coupling when uncoupled, a rod carrying the cap at one end and provided with a boss part way of its length, such boss fitting in the cylinder at one end, means for holding the boss in position but permitting of its rotatable movement, a plug in the other end of the cylinder, means for normally holding the plug against rotation, and a spring encircling the rod within the cylinder, the inner face respectively of the boss and plug being provided with means for engaging the ends of the spring whereby when the plug is rotated the spring tension may be adjusted.

20. In a hose-coupling, the combination with a coupling-head, of a cylinder thereon, a cap or guard adapted to close the coupling when uncoupled, a rod carrying the cap at one end and provided with a boss part way of its length, such boss fitting in the cylinder at one end and provided with a circumferential groove, a pin passing through the cylinder and received by the groove, a plug in the other end of the cylinder and a spring located within the cylinder and engaged at its ends by the boss and plug.

21. In a hose-coupling, the combination with a coupling-head, of a cylinder thereon, a cap or guard adapted to close the coupling when uncoupled, a rod carrying the cap at one end and provided with a boss part way of its length, such boss fitting in the cylinder at one end and provided with a circumferential groove, a pin passing through the cylinder and received by the groove, a plug in the other end of the cylinder provided with a screw-slot in its outer face, a removable pin passing through the cylinder and plug and retaining the latter in place and a spring located within the cylinder and engaged by both the boss and plug whereby the tension thereof may be regulated.

22. In a hose-coupling, the combination with a coupling-head, of a cylinder 4 upon the head, a spring-pressed rod 5 journaled at one end in the cylinder, a cap 13 mounted upon the other end of the rod and having a partial rotation thereon, and a latch device 15 adapted to engage the coupling-head and hold the cap open against the tension of the spring.

23. In a hose-coupling, the combination with a coupling-head, of a cylinder 4 upon the head, an angle-rod 5 journaled at one end in the cylinder, a spring 11 exerting its tension on the rod, a cap 13 mounted on the free end of the rod, a latch device 15 and an extension 18 on the cap and a plug 9 in the cylinder for adjusting the tension of the spring.

ASAHEL B. QUIMBY.

Witnesses:
W. H. JESSUP,
D. H. EVANS.